United States Patent

Iwamoto et al.

[11] Patent Number: 5,979,637
[45] Date of Patent: *Nov. 9, 1999

[54] PALLET CONVEYER

[75] Inventors: Shoji Iwamoto; Kazuo Itakura, both of Kanagawa, Japan

[73] Assignee: Fuji Photo Film Co., Ltd., Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/299,123

[22] Filed: Sep. 2, 1994

[30] Foreign Application Priority Data

Sep. 6, 1993 [JP] Japan .................................. 5-221396

[51] Int. Cl.$^6$ ...................................................... B65G 37/00
[52] U.S. Cl. ........................................ 198/465.1; 198/583
[58] Field of Search ............................ 198/345.2, 345.3, 198/465.1, 835, 583, 465.2

[56] References Cited

U.S. PATENT DOCUMENTS 2,719,625 10/1955 Schlegel ................................. 198/583
3,253,692 5/1966 Ota ......................................... 198/835
3,858,519 1/1975 Masino et al. ...................... 198/465.1

FOREIGN PATENT DOCUMENTS 318504 1/1991 Japan .............................. B65G 17/24

*Primary Examiner*—Joseph E. Valenza
*Attorney, Agent, or Firm*—Sughrue, Mion, Zinn, Macpeak & Seas, PLLC

[57] ABSTRACT

A pallet conveyer for successively conveying a plurality of pallets to stations arranged in accordance with a sequence of steps to be executed on each of the pallets. The pallet conveyer comprises at least two intermittent conveyers disposed in series with and spaced apart from each other, and a supplementary conveyer mounted removably between the two intermittent conveyers. The intermittent conveyer is associated with at least one work station, and is driven intermittently at a speed and an interval according to location and working time of the associated work station. The supplementary conveyer is driven continuously to convey the pallets from the preceding to the following intermittent conveyer, while absorbing the difference in speed and interval between the two intermittent conveyers.

8 Claims, 5 Drawing Sheets

PALLET CONVEYER

BACKGROUND OF THE INVENTION

1. Field of the Invention

The present invention relates to a pallet conveyer for use in a production line, and more particularly to a pallet conveyer whose construction is flexible in accordance with a change in the production line such as a change of the number of steps on the same production line.

2. Related Art

Conventionally, there are various kinds of production lines wherein a specific working machine or robot is disposed to each process or step such as an assembling process or soldering process, and work pieces are seriatim fed to each work station of the working machine or the robot though a conveyer such as a belt conveyer. The work pieces are sequentially put on a pallet which serves to position and support the work pieces during each process. The conveyer conveys a large number of such pallets thereon to intermittently fed the pallets from one work station to another after the working machines and robots complete the respective steps. The intermittent conveying operation is controlled by a servo motor or the like, for example, as disclosed in JPA 3-18504.

Because the work pieces are fed from one step to another through the single intermittent conveyer in the above-described production line, the conveyer is easy to control so long as the steps on the projection line are maintained unchanged.

However, on eliminating or adding some steps from or to the production line, the formerly used conveyer is not applicable to the revised production line any more, because the conveyer has a construction specifically designed for the former production line. Because the conventional conveyer is not applicable to another kind of production line either, it is necessary to design and produce a new conveyer each time the production line is revised or a new production line is to be provided. This is one of the causes which have increased the initial production cost of an article.

SUMMARY OF THE INVENTION

In view of the foregoing, a primary object of the present invention is to provide a pallet conveyer which can easily be adapted to a revised or new production line having a plurality of steps.

To achieve the above and other object, the present invention provides at least two intermittent conveyers disposed in series with and spaced apart from each other. Each of the intermittent conveyers is associated with at least one of a plurality of stations and is driven intermittently in accordance with the location of the associated station and working time for the station. Two of the intermittent conveyers are connected by a supplementary conveyer disposed between the two conveyers. The supplementary conveyer is continuously driven to convey the pallets from one to the other intermittent conveyer.

The supplementary conveyer may be driven continuously, that is, independently of the intermittent conveyers, so that the supplementary conveyer can transfer the pallets from the preceding intermittent conveyer to the following intermittent conveyer while absorbing a difference in conveying speed and interval between these two intermittent conveyers.

The supplementary conveyer may be removably secured to the intermittent conveyers. Accordingly, the pallet conveyer of the present invention is easy adjustable to any production line by removing or adding appropriate number of intermittent conveyers and supplementary conveyers.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein.

DETAILED DESCRIPTION OF THE PREFERRED EMBODIMENT

Figure 1:
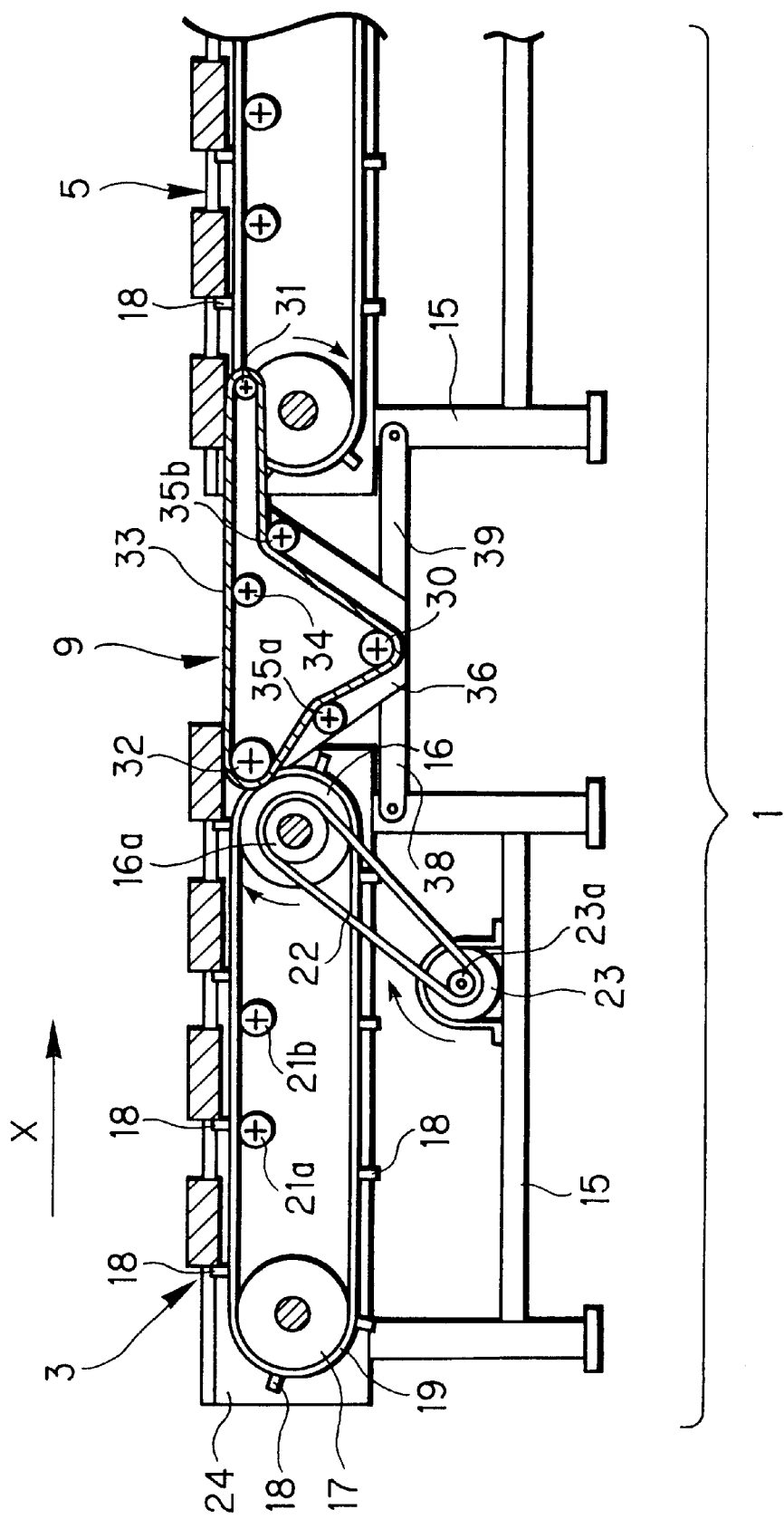
FIG. 1 is a longitudinal section, with portions broken away, of a pallet conveyer according to a preferred embodiment of the invention.
Figure 2:
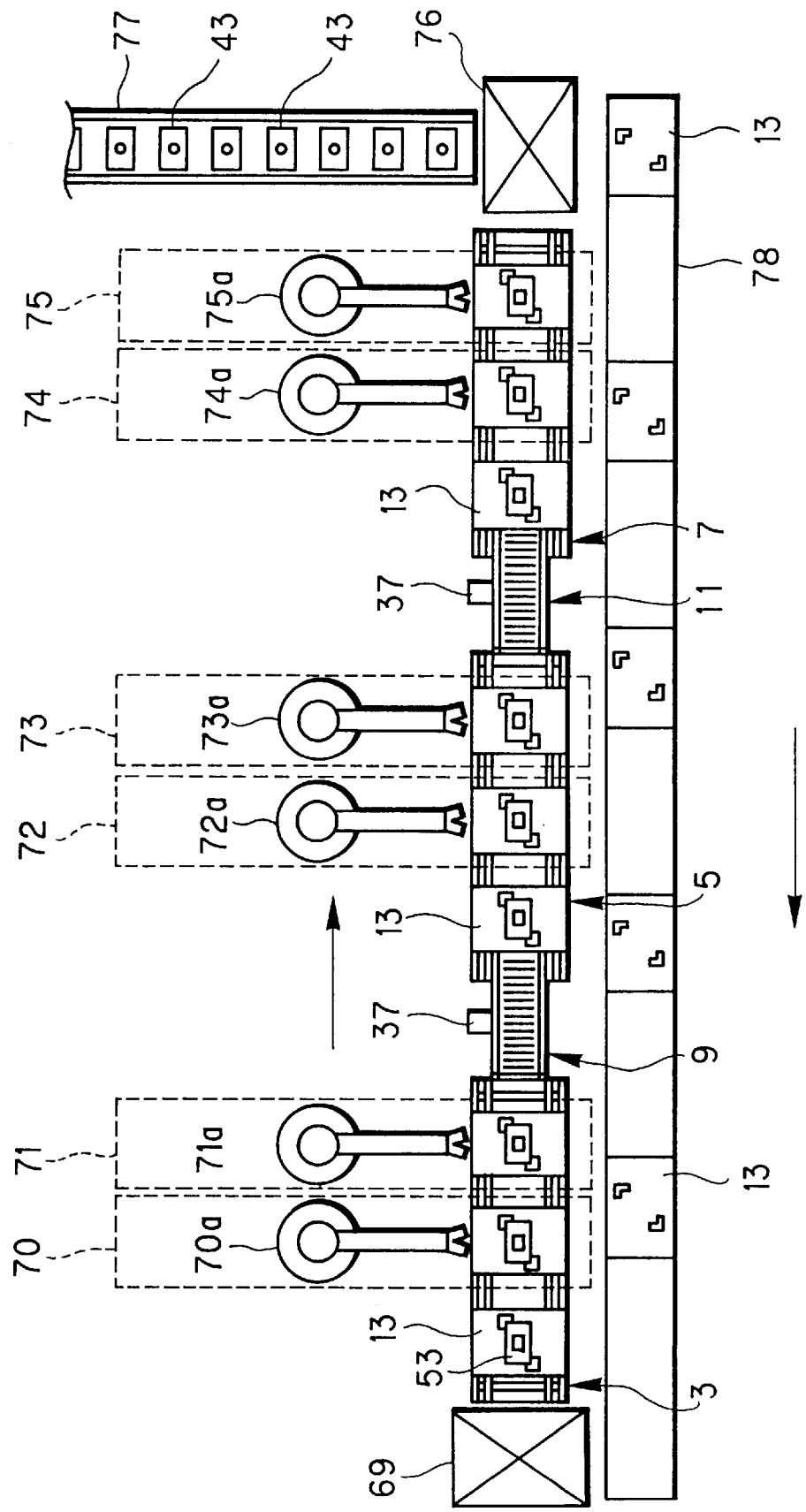
FIG. 2 is a plan view of the pallet conveyer shown in FIG. 1.
Figure 3:
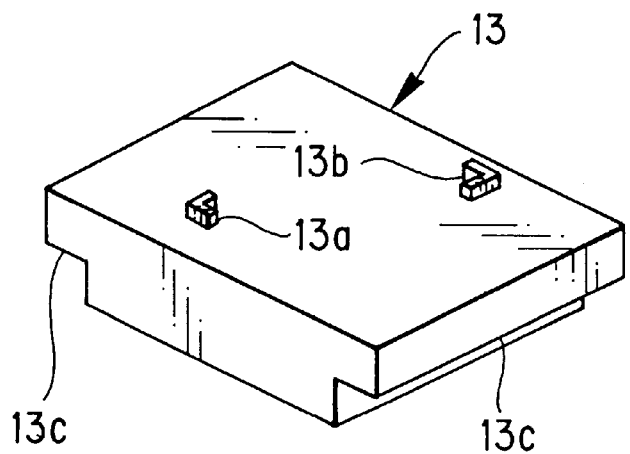
FIG. 3 is a perspective view of a pallet conveyed on the pallet conveyer shown in FIG. 1.

Referring to FIGS. 1 and 2, a pallet conveyer 1 according to a preferred embodiment is comprised of a first intermittent conveyer 3 for intermittently feeding work pieces to an initial step of a production line. The first intermittent conveyer 3 then feeds the work pieces from the initial step to the following step. The pallet conveyer 1 is further constituted of second and third intermittent conveyers 5 and 7, and first and second supplementary conveyers 9 and 11 disposed between the intermittent conveyers 3, 5 and 7. The pallet conveyer 1 can serially convey a plurality of pallets 13 thereon, each pallet 13 having a construction as shown in FIG. 3, for instance.

Figure 4:
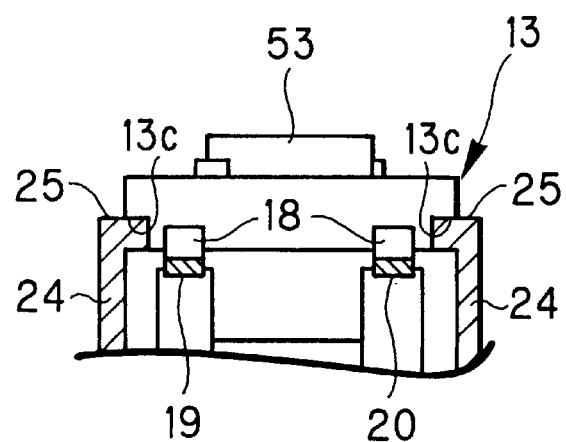
FIG. 4 is a transversal section of the pallet conveyer shown in FIG. 1.

As shown in FIGS. 1 and 4, the first intermittent conveyer 3 is constituted of a base portion 15 having legs for setting the conveyer 3 on a floor or the like, a pair of pulleys 16 and 17 mounted rotatably above the base portion 15, and two endless belts 19 and 20 disposed parallel to each other around the pulleys 16 and 17. The endless belts 19 and 20 each has a plurality of spacer projections 18 fixedly provided on the outer periphery thereof at regular intervals. The first intermittent conveyer 3 further has rotatable guide rollers 21a and 21b, a servo motor 23, an outer frame 24 for supporting the pulleys 16 and 17 and the guide rollers 21a and 21b on the opposite lateral sides thereof, and a pair of rails 25 formed integrally with the outer frame 24.

The servo motor 23 drives the first intermittent conveyer 3 through a transmission belt 22, which is suspended between a pulley 23a and a small pulley 16a. The pulley 23a is securely fitted on a rotary shaft of the servo motor 23, and the smaller pulley 16a is securely fitted on the same shaft as the pulley 16, so that the rotational movement of the servo motor 23 is transmitted to the pulley 16. The servo motor 23 rotates by a given amount to feed the pallets 13 from on work station to the next work station, which are disposed along the first intermittent conveyer 3, at time intervals corresponding to the respective steps in these work stations.

When the servo motor 23 rotates clockwise, the pulley 16 is rotated clockwise through the transmission belt 22. Then, the endless belts 19 and 20 are moved in a direction shown by an arrow X, and the spacer projections 18 of the endless belts 19 and 20 contact and push trailing ends of the pallets 13 to move in the direction X. Accordingly, the pallets 13 are moved in the direction X, while their sliding surfaces 13c, which are formed on opposite lateral sides of the bottom surface of the pallet 13, slide on the rails 25 of the outer frame 24 of the first intermittent conveyer 3. The guide rollers 21a and 21b support an upper middle area of the endless belt 19 and 20 from inside to prevent the endless belts 19 and 20 from lowering and thus prevent the spacer projections 18 from being disengaged from the pallets 13. The second and third intermittent conveyers 5 and 7 have the substantially same construction as the first intermittent conveyer 3, so that the detailed description thereof are omitted.

The first supplementary conveyer 9 is constituted of a bottom drive roller 30, upper two driven rollers 31 and 32, an endless belt 33 disposed around these rollers 30, 31 and 32, a guide roller 34 for supporting an upper middle portion of the endless belt 33 from the inside, and two idling rollers 35a and 35b pressing the endless belt 33 from the outside to prevent loosening of the belt 33. These rollers 30, 31, 32, 34, 35a and 35b are supported by a supporting plate 36 on opposite lateral sides thereof such that the first supplementary conveyer 9 is formed as a unit. The second supplementary conveyer 11 has the same construction as the first supplementary conveyer 9. The first and second supplementary conveyers 9 and 11 are disposed between the intermittent conveyers 3, 5 and 7, such that the driven roller 31 is disposed between the endless belts 19 and 20 of the following intermittent conveyer.

As shown in FIG. 2, the drive roller 30 is directly coupled to a motor 37 whose rotary shaft is inserted through the supporting plate 36. The motor 37 is controlled to rotate continuously, that is, independently of the intermittent conveyers 3, 5 and 7, so that the supplementary conveyers 9 and 11 can transfer the pallets 13 from the preceding intermittent conveyer to the following intermittent conveyer while absorbing the difference in conveying speed and interval between these two intermittent conveyers.

The supplementary conveyers 9 and 11 are removably attached to the base portions 15 of the intermittent conveyers 3, 5 and 7 through arm members 38 and 39 provided on the supporting plate 36. Accordingly, the pallet conveyer 1 is easy adjustable to any production line by removing or adding an appropriate number of supplementary conveyers or intermittent conveyers.

Figure 5:
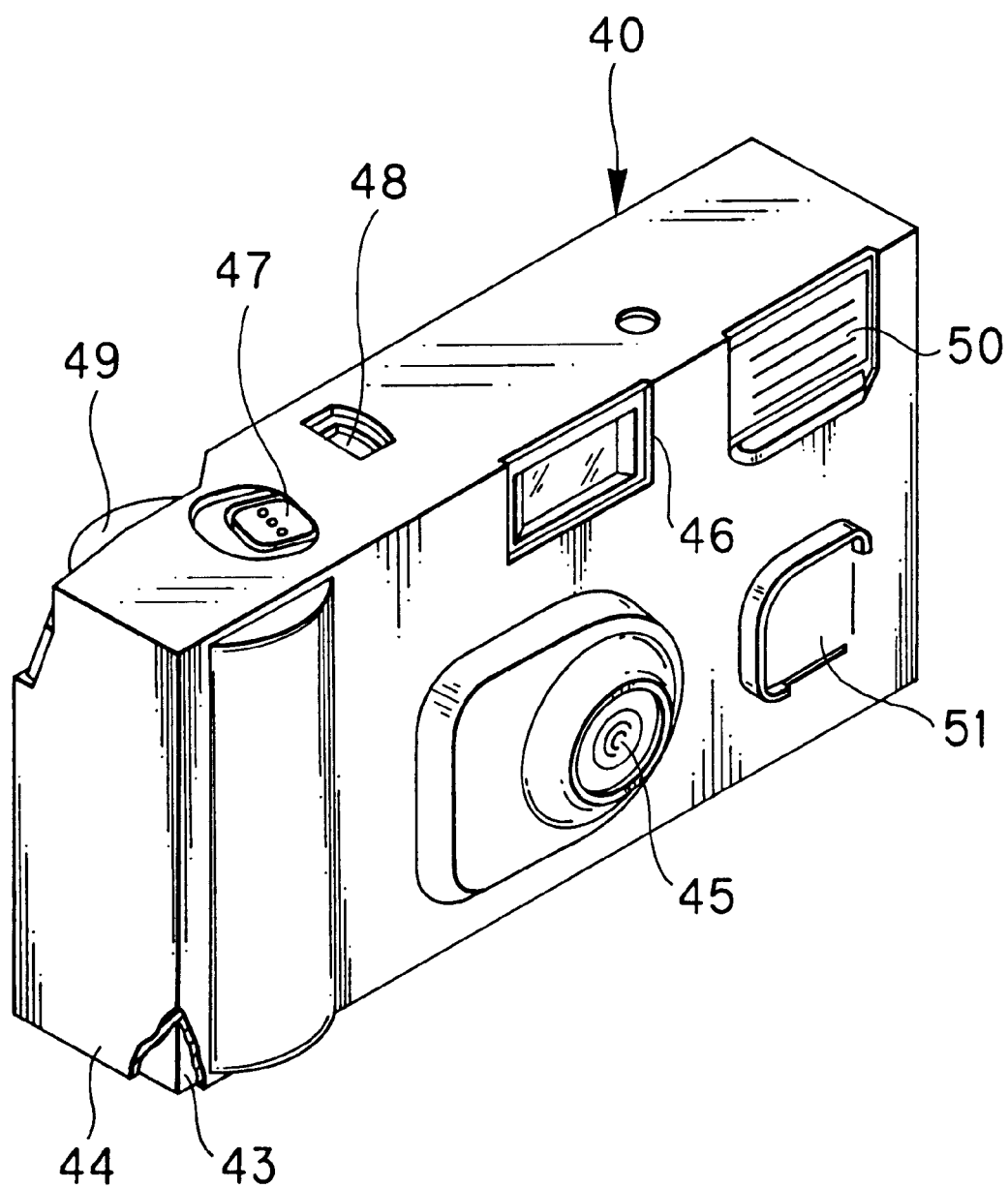
FIG. 5 is a perspective view of a lens-fitted photographic film unit.

Now the operation of the above-described pallet conveyer 1 will be described with respect to a case where the pallet conveyer 1 is used for assembling a lens-fitted photographic film unit, hereinafter referred to as a film unit, as shown in FIG. 5.

The film unit 40 is constituted of a unit body 43 and an outer casing 44 wrapping the unit body 43. The outer casing 44 is for decorating the unit body 43, and is made of printed paper or plastic sheet. The outer casing 44 has openings for exposing a taking lens 45, a viewfinder window 46, a shutter release button 47, a frame number indicator 48, a film wind-up wheel 49, a flash window 50 to the outside, so that the film unit 40 may be used without removing the outer casing 44.

Figure 6:
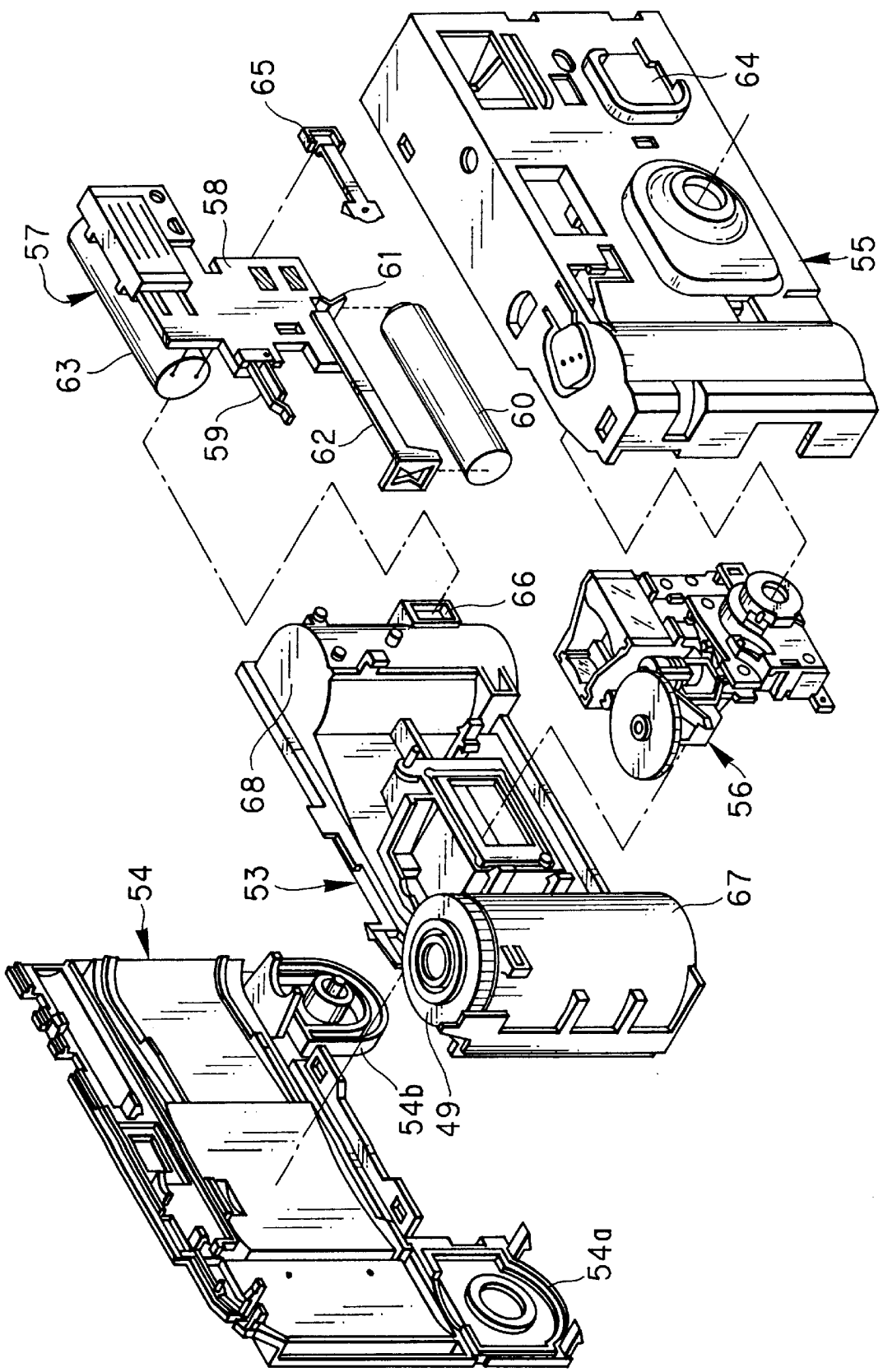
FIG. 6 is an exploded perspective view of the lens-fitted photographic film unit shown in FIG. 5.

As shown in FIG. 6, the unit body 43 is comprised of a basic portion 53 for holding a photographic film cassette, a rear cover 54 attached to the rear of the basic portion 53 to close the photographic film cassette in a light-tight fashion, a front cover 55 attached to the front of the basic portion, an exposure unit 56, and a flash unit 57 which are attached to the front of the basic portion 53 and covered with the front cover 55.

The flash unit 57 is constituted of a printed circuit board 58, a synchronized flash switch 59, a battery 60, a pair of battery contacts 61 and 62, a main capacitor 63, and so forth which are integrated into one body. To charge the main capacitor 63 with the battery 60, a contact plate 65, which is disposed behind a resilient portion 64 of the front cover 55, is pressed onto the printed circuit board 58 by depressing the resilient portion 64 through a charge switch portion 51 formed in the outer casing 44. The main capacitor 63 is discharged through a flash tube when the synchronized flash switch 59 is turned on in cooperation with a shutter release. The contact plate 65 is sandwiched between the front cover 55 and a cavity 66 formed in the basic body 53.

The basic body 53 has a cassette chamber 67 for holding a cassette shell of the photographic film cassette, and a film roll chamber 68 for holding unexposed photographic film previously pulled out from the cassette shell and wound into a roll. The bottoms of these chamber 67 and 68 are closed by bottom lids 54a and 54b formed integrally with the rear cover 54.

When assembling the above described film unit 40 on the production line as shown in FIG. 2, first the basic body 53 is supplied from a parts supply section 69 onto the pallet 13. The basic body 53 is fixedly positioned on the pallet 13 by confining projections 13a and 13b formed on the top surface of the pallet 13. The pallet 13 is then put on the rails 25 of the first intermittent conveyer 3 of the pallet conveyer 1. The servo motor 23 is rotated by a predetermined amount to rotate the endless belts 19 and 20, thereby to cause the spacer projections 18 of the belts 19 and 20 to push the pallets 13 in the direction X of FIG. 1. As a result, the pallet 13 slides on the rails 25 toward a first work station 70.

When the pallet 13 reaches the first work station 70, the first intermittent conveyer 3 pauses for a predetermined time, during which a robot 70a mounts the wind-up wheel 49 onto the top of the cassette chamber 67 of the basic body 53. After the mounting of the wind-up wheel 49, the servo motor 37 starts rotating again by the predetermined amount, to feed the pallet 13 from the first work station 70 to the second work station 71 and, simultaneously, feed the next pallet 13 to the first work station 70. When the pallets 13 reaches the first and second work stations 70 and 71, respectively, the first intermittent conveyer 3 pauses for the predetermined time which corresponds to the working or assembling time in the work stations 70 and 71.

In the second work station 71, a robot 71a mounts the exposure unit 56 to a front portion of the basic body 53. Thereafter, the first intermittent conveyer 3 conveys the pallet 13 from the second work station 71 toward the first supplementary conveyer 9. The first supplementary conveyer 9, as having the continuously rotating endless belt 33, transports the pallet 13 on the belt 33 to the second intermittent conveyer 5.

The pallet 13 is transferred from the endless belt 33 onto the rails 25 of the second intermittent conveyer 5. The endless belts 19 and 20 of the second intermittent conveyer 5 are not driven in this stage, so that the pallet 13 is stopped against the spacer projections 18 of the endless belts 19 and 20 of the second intermittent conveyer 5, while the endless belt 33 of the first supplementary conveyer 9 continues to rotate, and thus slips relative to the pallets 13. By virtue of the interconnection of the supplementary conveyer 9, the difference in working and transporting speed between the first and second intermittent conveyers 3 and 5 may be absorbed. Thereafter, the second intermittent conveyer 5 starts to transport the pallet 13 to the third work station by pushing the trailing end of the pallet 13 with the spacer projections 18 of the endless belts 19 and 20.

When the pallet 13 reaches the third work station 72, the second intermittent conveyer 5 pauses for a given time, so that a robot 72a mounts the flash unit 57, the contact plate 65 and the battery 60 to the basic portion 53. In the same way as above, the front cover 55 is attached to the basic portion 53 by a robot 73a in the fourth work station 73, and a photographic film cassette is loaded in the cassette chamber 67 and the film roll chamber 68 by a robot 74a in the fifth station 74. In the sixth station 75, a robot 75a attaches the rear cover 54 to the basic portion 53, to complete the unit body 43. The work stations 74 and 75 are disposed in the dark so as to shield the unexposed photographic film from ambient light.

The unit body 43 assembled in this way is removed from the pallet 13 by a sorting device 76, and is conveyed on a conveyer 77 toward the next working station wherein the unit body 43 is wrapped with the outer casing 44. The empty pallet 13 is fed back to the supply section 69 through a feed-back conveyer 78.

Although the pallet conveyer 1 according to the preferred embodiment of the invention has been described in connection with the assembling line of the film unit 40, the pallet conveyer is applicable to an assembling line of another article or a disassembling line of a film unit or another article.

It is also possible to form a supplementary conveyer to have a curved conveying path, thereby to turn the conveying direction of the pallets. This modification makes it possible to install an elongated production line in a limited space. The second intermittent conveyer may be activated when the pallet reach a position close to the second intermittent conveyer. For this modification, a pallet sensor should be provided in the position close to the second intermittent conveyer. The intermittent conveyers may be driven intermittently at predetermined timing before the pallet is sent from the supplementary conveyers if the supplementary conveyer is driven synchronously with the following intermittent conveyer.

Although the driven roller 31 is disposed between the endless belts 19 and 20 of the following intermittent conveyer in the above-described embodiment, it is, of course, possible to provide intermittent conveyers having a single endless belt and a supplementary conveyer having two parallel endless belts, so as to dispose the trailing ends of the endless belts of the supplementary conveyer on opposite lateral sides of the leading end of the endless belt of the following intermittent conveyer. It is also possible to dispose the driven roller 31 of the supplementary conveyer above the single endless belt of the following intermittent conveyer in order to overlap the trailing end of the supplementary conveyer with the leading end of the following intermittent conveyer.

Also, it will be apparent to one skilled in the art that various other modifications can be made to the disclosed embodiment without departing from the scope of the invention as defined by the appended claims.

What is claimed is:

1. A pallet conveying apparatus for successively conveying a plurality of pallets to work stations which are arranged in accordance with a sequence of steps to be executed on each of said pallets, each of said pallets carrying predetermined work pieces in designated positions thereon, said pallet conveying apparatus comprising:

a plurality of intermittent conveyers disposed in series with and spaced apart from each other, each of said intermittent conveyers being associated with at least one of said work stations and being driven intermittently at a speed and an interval according to location and working time of said associated work station; and a supplementary conveyer disposed between adjacent two of said intermittent conveyers, said supplementary conveyer being driven continuously to convey said pallets from upstream one to downstream one of said two intermittent conveyers, said supplementary conveyer being removably attachable to said intermittent conveyers.

2. A pallet conveying apparatus as recited in claim 1, wherein said intermittent conveyers are driven independently from each other, and said supplementary conveyer is driven at a speed for absorbing the difference in speed and interval between said two intermittent conveyers.

3. A pallet conveying apparatus as recited in claim 2, wherein a trailing end of said supplementary conveyer overlaps with a leading end of the following intermittent conveyer.

4. A pallet conveying apparatus as recited in claim 3, wherein said supplementary conveyer comprises a drive roller driven by a motor, first and second driven rollers disposed at the ends of said supplementary conveyer and above said drive roller, an endless belt disposed around said rollers, and first and second idling rollers disposed outside said endless belt and pressing said endless belt inwards at portions between said drive roller and said first and second driven rollers, so as to tense said endless belt.

5. A pallet conveying apparatus as recited in claim 4, wherein each of said intermittent conveyers comprises a pair of pulleys disposed at the ends of said intermittent conveyer, a pair of endless belts disposed in parallel with each other around said pulleys, a motor for driving one of said pulleys, and wherein said trailing end of said supplementary conveyer is disposed between said pair of endless belts of the following intermittent conveyer.

6. A pallet conveying apparatus as recited in claim 5, wherein said endless belts of said intermittent conveyers each has a plurality of projections formed on the outer periphery thereof, said projections being spaced at regular intervals for accepting said pallets in the spacings between said projections and pushing trailing ends of said pallets to move along with said endless belts.

7. A pallet conveying apparatus as recited in claim 3, wherein one of said intermittent conveyers comprises a single endless belt, and said supplementary conveyer comprises a pair of endless belts disposed in parallel with each other, trailing ends of said endless belts being disposed on opposite lateral sides of a leading end of said single endless belt of said one intermittent conveyer.

8. An apparatus as recited in claim 1, further comprising:

arm members extending from said supplementary conveyor, said arm members being adapted to be removedly connected to said intermittent conveyors.

* * * * *